(12) United States Patent
Laker et al.

(10) Patent No.: US 7,676,464 B2
(45) Date of Patent: Mar. 9, 2010

(54) PAGE-RANKING VIA USER EXPERTISE AND CONTENT RELEVANCE

(75) Inventors: Meir M. Laker, Spring Valley, NY (US); Jonathan Lenchner, North Salem, NY (US); Daniel Milch, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 11/377,413

(22) Filed: Mar. 17, 2006

(65) Prior Publication Data

US 2007/0219993 A1    Sep. 20, 2007

(51) Int. Cl.
G06F 7/00 (2006.01)
G06F 17/30 (2006.01)
(52) U.S. Cl. .......................................................... 707/5
(58) Field of Classification Search ........................ None
See application file for complete search history.

(56) References Cited

U.S. PATENT DOCUMENTS

| | | | |
|---|---|---|---|
| 5,678,041 A | 10/1997 | Baker et al. | |
| 5,875,446 A | 2/1999 | Brown et al. | |
| 5,920,859 A | 7/1999 | Li | |
| 5,961,645 A | 10/1999 | Baker | |
| 6,088,659 A * | 7/2000 | Kelley et al. | 702/62 |
| 6,112,202 A | 8/2000 | Kleinberg | |
| 6,112,203 A | 8/2000 | Bharat et al. | |
| 6,230,153 B1 | 5/2001 | Howard et al. | |
| 6,285,999 B1 | 9/2001 | Page | |
| 6,289,342 B1 | 9/2001 | Lawrence et al. | |
| 6,356,899 B1 | 3/2002 | Chakrabarti et al. | |
| 6,920,448 B2 * | 7/2005 | Kincaid et al. | 707/3 |
| 2003/0126044 A1 | 7/2003 | Lucas | |
| 2005/0262050 A1 | 11/2005 | Fagin et al. | |
| 2007/0149288 A1 * | 6/2007 | Nickell et al. | 463/42 |
| 2007/0150470 A1 * | 6/2007 | Brave et al. | 707/6 |

OTHER PUBLICATIONS

SQL Database Maintenance Plan and Recommended Backup Procedures for Board Child Care Servers, Dec. 3, 2003, pp. 1, 7, 8.*
Gospodetic, How can I index XML documents?, HTML, Dec. 18, 2003, Available: http://www.jguru.com/faq/topicindex.jsp?topic=Lucene [Aug. 6, 2008].*

* cited by examiner

*Primary Examiner*—Pierre M Vital
*Assistant Examiner*—Jason Liao
(74) *Attorney, Agent, or Firm*—Stephen C. Kaufman, Esq.; McGinn IP Law Group, PLLC

(57) ABSTRACT

A page-ranking method includes mining a portion of content of a user workstation which is connectable to a network to detect references to pages of the network. The pages may be ranked based on the detected references.

20 Claims, 5 Drawing Sheets

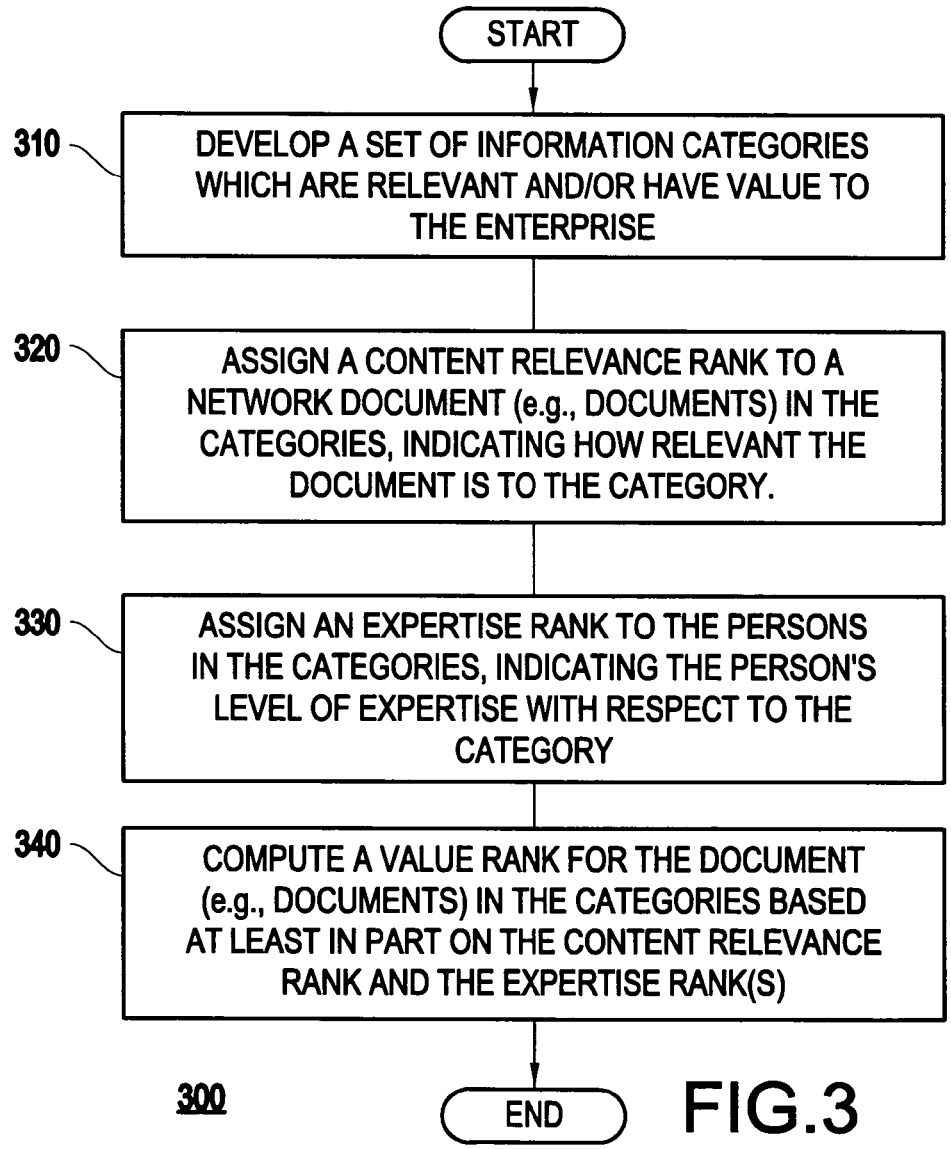

TABLE 1
CONTENT RELEVANCE RANK

| DOCUMENT | RELEVANT CATEGORIES | | | | | | |
|---|---|---|---|---|---|---|---|
| | 1 | 2 | 3 | 4 | 5 | 6 | 7 |
| 1 | | | | | | | |
| 2 | | | | | | | |
| 3 | | | | | | | |
| 4 | | | | | | | |
| 5 | | | | | | | |

FIG. 4A

TABLE 2
EXPERTISE RANK

| PERSON | RELEVANT CATEGORIES | | | | | | |
|---|---|---|---|---|---|---|---|
| | 1 | 2 | 3 | 4 | 5 | 6 | 7 |
| A | | | | | | | |
| B | | | | | | | |
| C | | | | | | | |
| D | | | | | | | |
| E | | | | | | | |

FIG. 4B

TABLE 3
PAGE COUNTS PER PERSON

| DOCUMENT | PERSON | | | | | | |
|---|---|---|---|---|---|---|---|
| | A | B | C | D | E | F | G |
| 1 | | | | | | | |
| 2 | | | | | | | |
| 3 | | | | | | | |
| 4 | | | | | | | |
| 5 | | | | | | | |

FIG. 4C

PAGE-RANKING VIA USER EXPERTISE AND CONTENT RELEVANCE

BACKGROUND OF THE INVENTION

1. Field of the Invention

The present invention relates to an page-ranking metho; (e.g., and system) and, more particularly, an page-ranking method which includes mining a portion of an network (e.g., intranet) user's desktop computer (e.g., files, documents, bookmarks, e-mail, and potentially all other content associated with and/or stored on the user's personal computer) in order to compute the ranking.

2. Description of the Related Art

Internet search engine websites such as www.google.com (hereinafter "Google™") are known to work well for searching the Internet. The Google™ search engine has an important feature that helps it produce high precision results in Internet searches. Namely, it makes use of the link structure of the Web to calculate a quality ranking for each web page. This ranking is called PageRank.

However, while Internet search engines such as Google™ may work well for searching the Internet, these search engines do not work well for searching other networks such as an intranet. The strategy of such Internet search engines assumes that there is a relatively high number of hyperlink references to high-value pages. The number of such references and the value of the referring pages can be used to compute the value of the referenced page.

However, while these assumptions have been proven to work well for the Internet, the assumptions do not work well for other networks such as intranets. This is due at least in part to the fact that other networks (e.g., intranets), unlike the Internet, lack economic and other incentives for cross-referencing other valuable pages.

For example, an intranet page's author generally has little motivation to embed such references in the pages for which he is responsible. Therefore, the density of such references in intranet pages (e.g., documents), relative to the density of such references in Internet pages, is low. Further, the number of references to a given intranet page that do exist may have little to do with the value of that intranet page.

FIG. 1 illustrates a related art system 10 (e.g., modular scoring system) for ranking search results which is disclosed by Fagin et al. ("SYSTEM, METHOD AND SERVICE FOR RANKING SEARCH RESULTS USING A MODULAR SCORING SYSTEM", U.S. Pat. Pub. No. 2005/0262050), and which is commonly assigned with the present invention and incorporated by reference herein.

The system 10 includes a computer program product stored on a host server connected to a network (e.g., intranet, Internet, etc.). The system 10 includes a set of scoring modules 105, a duplication module 110, and a rank aggregation processor 115. Each of the scoring modules 105 takes as input one or more graded sets of documents (e.g., pages), an auxiliary information module 125, and (optionally) a query 120. Output from each of the scoring modules to the rank aggregation processor 115 is a ranked set of documents. The rank aggregation processor 115 may weight the outputs from each of the scoring modules 105 equally, or it may weight the outputs from each of the scoring modules 105 differently to meet scoring requirements of a specific client, user, intranet, or network.

Scoring modules 105 include a set of indices 130 such as, for example, a content index 135, a title index 140, and an anchortext index 145. Additional indices may be used as desired. The content index 135, the title index 140, and the anchortext index 145 take as input query 120 and find a set of documents in dB 40 that match the text of input query 120. The indices provide pointers into the set of documents in dB 40 containing the query terms, and pass them to the union module 150 and to the rank aggregation processor 115.

Indices 130 provide graded lists of found documents that are scored using any suitable scoring analysis such as, for example, TF*IDF (Term Frequency Times Inverse Document Frequency). TF*IDF scores a document based on the number of times a query term appears in a document: the higher the term frequency, the more relevant the document. Further, TF*IDF weights the relevance of a query term based on the inverse of the number of documents containing the query term. TF*IDF places more weight on a less common term than a more common term as determined by the number of documents found with each term. Consequently, documents with the highest number of least common terms in the search query receive the highest score.

The outputs of indices 130 are combined in a union module 150 to form a single graded set of documents. The duplication module 110 duplicates the single graded set of documents as needed to provide inputs to the scoring modules 105. As needed, scoring modules 105 may also utilize query 120 and auxiliary information module 125 as input. Scoring modules 105 further include ranking or scoring processors such as, for example, a page-ranking processor 155, an indegree processor 160, a discovery date processor 165, a uniform resource locator (URL) word processor 170, a URL depth processor 175, a URL length processor 180, a geography processor 185, a discriminator processor 190, etc. The scoring modules 105 may be selected or deselected by selection module 195 as needed for a query, a user, a client, a network (e.g., an intranet), etc.

The rank aggregation processor 115 utilizes a variety of methods to aggregate the outputs of the scoring modules 105 such as, for example, positional methods, graph methods, or Markov chain methods. For example, when using positional methods, the rank aggregation processor 115 gives each document an output score that is computed as a function of the various ranks received by a document from the scoring modules 105. The output score assignment may be determined by, for example, the mean rank or the median rank. A document is then scored by the output rank received.

However, it is desirable to improve the quality of the rankings associated with a page-ranking system and method.

SUMMARY OF THE INVENTION

In view of the foregoing and other exemplary problems, disadvantages, and drawbacks of the aforementioned conventional systems and methods, it is a purpose of the exemplary aspects of the present invention to provide a page-ranking method and system which may be used to quickly and efficiently return a large number of highly relevant pages in response to a search.

An exemplary aspect of the present invention includes a page-ranking method including mining a portion of the content of a user workstation which is connectable to (e.g., connected to or may be connected to) a network to detect references to pages of the network. The pages may be ranked based on the detected references.

Another exemplary aspect of the present invention includes a page-ranking system. The system includes a mining module (e.g., software module) for mining a portion of content of a user workstation which is connectable to (e.g., connected to or may be connected to) a network (e.g., an intranet) to detect references to pages of the network. The system may also include a ranking module for ranking the pages based on the detected references.

Another exemplary aspect of the present invention includes a programmable storage medium tangibly embodying a program of machine-readable instructions executable by a digital processing apparatus to perform the page-ranking method according to the exemplary aspects of the present invention.

Further, the page-ranking method according to the exemplary aspects of the present invention may also include deploying computing infrastructure in which computer-readable code is integrated into a computing system, such that the code and the computing system combine to perform the method.

With its unique and novel features, the present invention provides a page-ranking method (and system) which may be used to quickly and efficiently return a large number of highly relevant pages in response to a network search.

BRIEF DESCRIPTION OF THE DRAWINGS

The foregoing and other exemplary purposes, features, aspects and advantages will be better understood from the following detailed description of the exemplary embodiments of the invention with reference to the drawings, in which:

FIG. 2 illustrates a page-ranking method 200, according to the exemplary aspects of the present invention;

FIG. 3 provides a flowchart illustrating a page-ranking method 300, according to an exemplary aspect of the present invention;

FIG. 4A (Table 1) provides a chart which includes a content relevance rank for the pages (e.g., intranet documents), according to an exemplary aspect of the present invention;

FIG. 4B (Table 2) provides a chart which includes an expertise rank for persons in the enterprise, according to an exemplary aspect of the present invention;

FIG. 4C (Table 3) provides a chart which includes the page references per person on a network, according to an exemplary aspect of the present invention;

DETAILED DESCRIPTION OF THE EXEMPLARY EMBODIMENTS OF THE INVENTION

Figure 1:
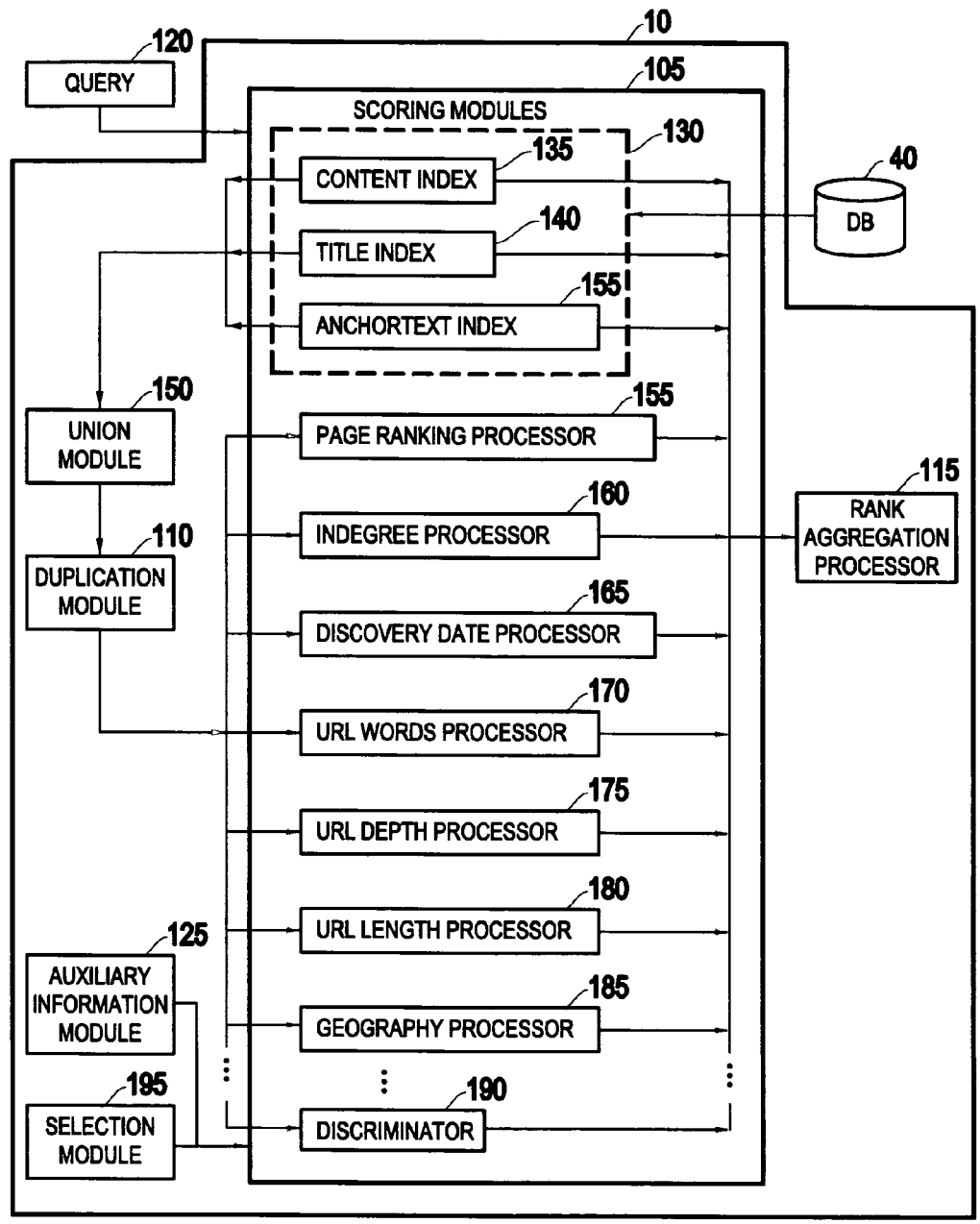
FIG. 1 illustrates a related art system 10 (e.g., modular scoring system) for ranking search results.

Referring now to the drawings, FIGS. 2-7 illustrate the exemplary aspects of the present invention.

In particular, FIG. 2 illustrates a page-ranking method 200 according to the exemplary aspects of the present invention. The method 200 includes mining (210) (e.g., scanning, crawling, searching, etc.) a portion of content of a user workstation which is connectable to (e.g., connected to or may be connected to) a network (e.g., an intranet) to detect (e.g., determine the existence of; learn of; obtain; identify) page references in that portion of content.

The portion of content of the user workstation which may be mined includes any file that is textually minable (e.g., any file that can be textually mined) and is residing on and/or attached to a user workstation. For example, the hard drives of user workstations that are connected to an intranet may be mined to detect references to intranet pages (e.g., intranet documents) in files (e.g., browser bookmarks (e.g., favorites), e-mail (e.g., internal email, external email, etc.), instant messages, text files (e.g., unstructured text files), etc.) which may be stored on the hard drives.

Further, the references to the respective network pages may be counted. For example, in a simple exemplary embodiment of the present invention, the pages may be ranked based on the number of references to the respective pages detected in the mining operation. For example, if the mining operation detects fifty references to Page A, and sixty references to Page B, then Page A may be ranked higher than Page B.

It should be noted that the term "workstation" may be defined herein to mean any device (e.g., personal computer, notebook computer, etc.) capable of connecting to the network (e.g., intranet) and from which a user (typically one user, but possibly several) may send and receive e-mail messages, access network pages, and/or perform network searches.

The term "network" used herein may be construed to include any network of user workstations (e.g., Internet, intranet, etc.). Specifically, the term "intranet" as used herein may be construed to mean a restricted-access network that may work like the world wide web (e.g., the Internet), but is not necessarily on the world wide web. An intranet may be owned and/or managed, for example, by an entity (e.g., a business enterprise such as a corporation or partnership, a university, a federal, state or municipal government, etc.). For example, an intranet may enable a company to share its resources with its employees without confidential information being made available to everyone with Internet access. The term "intranet" may also include a virtual private network (VPN) which is owned and/or managed by such an entity.

The exemplary aspects of the present invention include a page-ranking system. The system includes a mining device for mining at least a portion of a user workstation which is connectable to a network (e.g., an intranet) to obtain network page references (e.g., intranet page references). The mining device may be implemented, for example, in the form of software (e.g., machine-readable instructions stored on a medium and executable by a digital processing apparatus (e.g., computer)) stored on a central network server. The page-ranking system may be utilized, for example, to return relevant pages in response to a search (e.g., a keyword search) on the network (e.g., an intranet).

The software may be accessible and executable by a server (e.g., cache server) of the network (e.g., an intranet server). The code may be included for example in scanning code (e.g., e-mail scanning code) and/or crawling code. Thus, the page-ranking method and system may be used, for example, by using a user workstation (e.g., computer, desktop, etc.) connected to the network to direct the server to perform a search operation.

Overview

The inventors have concluded that one reason that search engines such as Google™ do not work well for networks (e.g., intranet (e.g., corporate intranet) environments) other than the Internet, is that while page reference counts accumulated by a search engine crawler (e.g., the Google™ crawler mechanism) are a good measure of Internet page value, these counts are not such a good measure for pages (the Background section, above, supplies the basis for this conclusion) in other networks (e.g., intranets).

A problem addressed by the present invention is that of determining a page-ranking technique for a network environment which is qualitatively competitive with the best Internet search engines (e.g., google.com, yahoo.com, etc.).

In an exemplary aspect of the present invention, instead of (or in addition to) mining th network for network page references (as Google™ does on the Internet), the present invention may mine segments (e.g., portions) of a user workstation (e.g., a plurality of user workstations such as a plurality of employees' desktop computers) for page references. Possible sources for desktop page references may include, for example, browser bookmarks, e-mail, instant messages and text files (e.g., unstructured text files) stored on a hard drive. However, this list of sources is not intended to be limiting, and other sources could be used by the present invention.

It should be noted that the mining operation in the present invention may be accomplished in a variety of manners. For example, an application written for the purpose of periodically sifting through the above-referenced sources and forwarding the relevant data on a collection server can be deployed to the workstations (e.g., all workstations connected to the network). Alternatively, the mining operation can be piggy-backed onto an existing task (e.g., a corporate back-up process) which accesses files on the workstations (e.g., each and every workstation connected to the network).

Generally, in order to minimally impact tasks being performed by a user interacting with a workstation, the mining operation can be performed concurrently with such an existing task, but may be performed at a lower scheduling priority than the existing task. In addition, the mining operation can be scheduled (e.g., scheduled independently by workstation users) to be performed off-shift, or at some other time when the workstation is likely to be otherwise idle.

The privacy issue on the Internet precludes the use of these sources. However, on a network such as an intranet (e.g., a corporate intranet), there are ways of dealing fairly with this issue. For example, a company can establish rules specifying those segments of a desktop and/or e-mail store that are "fair game" for page reference scanning, and those segments which are off limits to page reference scanning. The exact rules may vary by company, but the overall strategy for crawling and/or scanning the permitted segments of each desktop may still apply.

The idea of the present invention assumes, in part, that it is the poor state of current network search itself which motivates individuals to accumulate, through various means, lists of valuable pages (e.g., intranet pages), for example, in browser-structured bookmark stores, in unstructured text files, and in e-mails to colleagues.

Scanning and/or crawling code could be developed for mining the stores described above, and would resemble in broad design the code developed for crawling the Internet. For example, in many corporate environments (e.g., most corporate environments), employee desktops and/or hard drives (HDs) are already being scanned for back-up purposes. Companies know and employees acknowledge that protecting this intellectual property (IP) is a requirement for running a business.

Mining user workstations (e.g., desktops) for page references (e.g., intranet page references) (e.g., from bookmark stores and unstructured text files, etc.) could therefore be performed as part of the existing corporate back-up process. Corporate e-mail scanning code could be added to the existing infrastructure for handling this e-mail.

Further, the present invention may include a learning function such that the invention can have a capability of refining and improving the quality of page-ranking and thus, the quality of search provided by the present invention. For example, such a learning function could be imbedded in the scanning code.

For example, the learning function may be provided by a weighting system included in the scanning code or crawling code. This would allow the present invention (e.g., over time) to be able to distinguish the better page reference sources from among other sources. For example, it would allow the present invention to discover which employees are good at early identification of network (e.g., intranet) pages which many employees ultimately value (e.g., hold references to).

Detailed Discussion

Google's voting-based strategy for ranking a given web page depends to a significant extent on references from all other web pages to the page in question. This strategy uses both the number of such references and the ranking of each of the referring pages.

However, this ranking strategy does not necessarily work well for networks (e.g., intranets) other than the Internet. For example, the density of intranet page references is often much lower than the density of Internet page references, due perhaps primarily to an absence in the intranet environment of economic and other motivations (e.g., motivations which are present in the Internet environment) for page authors and/or sponsors to include references to other high-value pages.

Therefore, a purpose of the present invention is to provide an alternative voting-based page-ranking resource available for networks such as intranets. The inventors propose that page references found on user workstations (e.g., desktops) can be used for this purpose.

Specifically, the present invention provides a comparable (e.g., comparable to Internet search engines such as Google™) voting-based page-ranking system for networks. A difference between the present invention and the Internet search engines is that unlike an Internet ranking process (e.g., as used by search engines such as Google™) that derives voting data from page references found in web pages, the present invention may derive voting data from page references mined from workstation content.

FIG. 3 provides a flowchart illustrating a page-ranking method 300 according to another exemplary aspect of the present invention. Further, FIGS. 4A-4D provide Tables 1-4, respectively, which illustrate an exemplary aspect of the present invention. Specifically, FIG. 4A (Table 1) provides a chart which includes a content relevance rank for the pages (e.g., intranet documents), FIG. 4B (Table 2) provides a chart which includes an expertise rank for persons in the enterprise, FIG. 4C (Table 3) provides a chart which includes the page references per person on the network, and FIG. 4D (Table 4) provides a chart which includes a value ranking for the pages.

In this exemplary aspect, value rankings may be determined for pages according to the following exemplary process (it should be noted that this process is merely illustrative and may be modified within the scope of the present invention):

1. Develop (310) a set of information categories which are relevant and/or have value to the enterprise. For example, the categories may include manufacturing, human resources, research and development, etc;

2. Assign (320) a content relevance rank to the network page (e.g., each page) in the categories (e.g., each category), indicating how relevant the page is to the category. (It is expected that the burgeoning field of automatic page classification will, in the near-term, provide more and better systems for performing this task.);

3. Assign (330) an expertise rank for a person (e.g., each person) in the categories (e.g., each category), indicating the person's level of expertise with respect to the category.

A combination of techniques may be used to rank personal expertise. First, a baseline expertise in each category may be optionally initialized according to the person's job rating and position within an organization (e.g., a person in the Human Resources Department would normally be assigned a higher expertise rank in a "Human Resources Category" than a person in the Accounting Department, and so on). The initial rank for the persons (e.g., each person) in the categories (e.g., each category) may then be increased in proportion to the number of pages in that category that are mined from his workstation.

Additionally, it can be inferred that a pair of individuals who exchange e-mail referencing pages assigned to a given category, and whose workstations also contain pages and/or references to pages in that category, may be part of a "community of expertise" in that category. Therefore, the expertise ranks of those individuals in that category may be further increased.

4. Compute (340) a value rank for a page (e.g., each page) in the categories (e.g., each category) based at least in part on the content relevance rank and expertise rank(s). For example, the value rank could be computed as follows:

a. Mine the user workstations (e.g., portions of the user workstations) on the network and count the number of references (e.g., hyperlinks) to pages on the network;

b. When a reference (e.g., hyperlink) to a page is found in a desktop (e.g., in a list of bookmarks), increase the value rank of the page in a category (e.g., each category) based on the relevance rank of the page and the expertise rank of the person with respect to that category.

It should be noted that the manner in which the relevance rank and the expertise rank are combined is not necessarily limited. For example, the increase in value rank may be given by some formula which includes the relevance rank and expertise rank. For example, such a formula might be $Y=R*E$, where Y is the value rank increase, R is the relevance rank and E is the expertise rank, and so on. Further, the formula may be refined based on later data accumulated by the present invention.

c. When a reference (e.g., hyperlink) to a page is found in an e-mail (e.g., received e-mail, sent e-mail, forwarded e-mail, etc.), increase the value rank for the page in the categories (e.g., each category). For each category, consider the expertise rank of both sender and recipient, in addition to the relevance rank of the page.

Again, the manner in which the relevance rank and the expertise ranks of sender and recipient are combined is not necessarily limited. For example, the increase in value rank may be given by some formula which includes the relevance rank and expertise ranks. For example, such a formula might be $Y=R*E_S*E_R$, where Y is the value rank increase, R is the relevance rank and $E_S$ is the sender expertise rank, $E_R$ is the recipient expertise rank and so on. This formula may also be refined based on later data accumulated by the present invention.

d. When a reference (e.g., hyperlink) to a page is found in an instant message (e.g., a message passed through an instant messaging facility, etc.), increase the value rank for the page in the categories (e.g., each category), increase value rank for page referred to in message. This may be done similarly to the manner of e-mails discussed in section (b) above.

The page-ranking method 300 may be performed routinely and periodically (e.g., hourly, daily, weekly, etc.). That is, the page value ranking chart in FIG. 4D may be continuously updated. When a networ, (e.g., intranet) search is performed, the page value ranks may be quickly referred to in order to determine the order in which matching pages should be returned.

Further, the manner in which the pages are returned by a search may vary. For example, the order in which the pages are returned may be some function of its value ranks. For example, the pages could be returned based on the sum of the pages' value ranks across all of the categories. For example, if Page 1 had a cumulative value ranking across all of its categories which was higher than the cumulative value ranking of Page 2 across all of its categories, Page 1 would be returned before Page 1 in response to the search.

Alternatively, the pages could be returned in an order which is based on the pages' highest value rank in any category, based on a sum of the pages' highest 3 value ranks, based on the pages' highest median value rank across the categories, etc.

Figures 4D, 5:
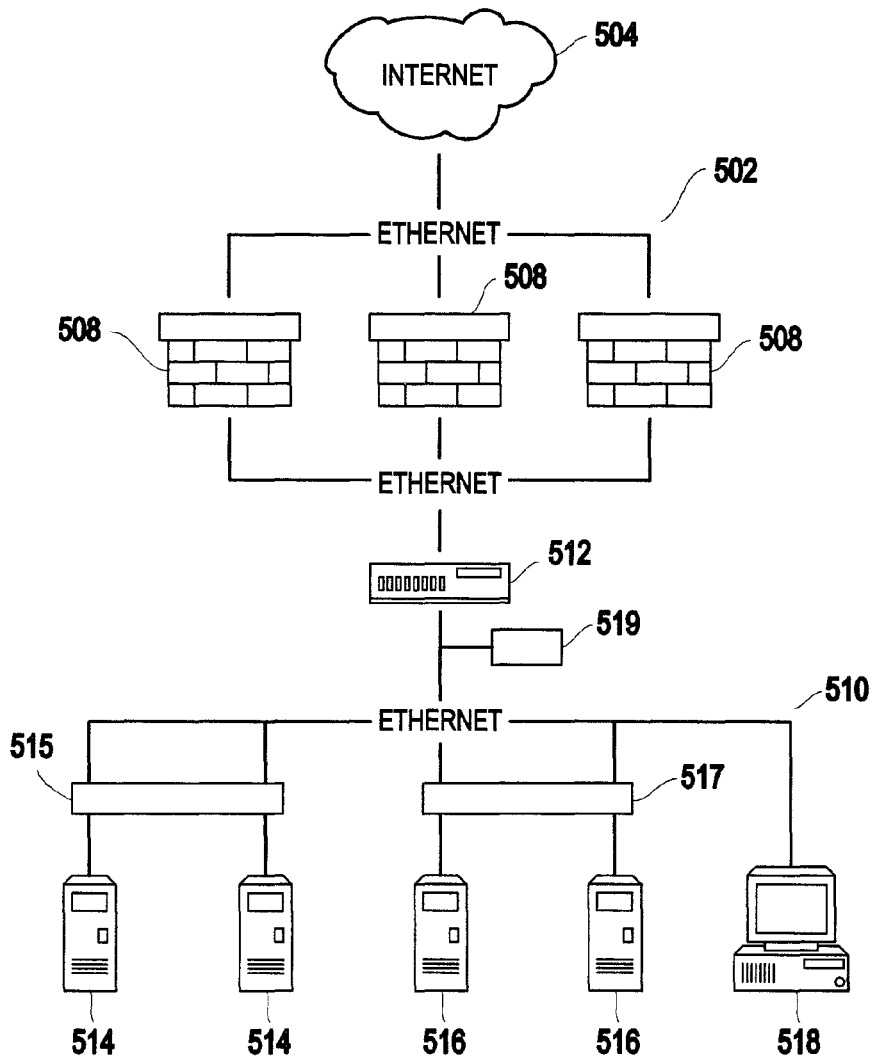
FIG. 4D (Table 4) provides a chart which includes a value ranking for the pages, according to an exemplary aspect of the present invention.
FIG. 5 illustrates a network (e.g., an intranet) 500 which may utilize the page-ranking method (and system), according to the exemplary aspects of the present invention.
Figure 7:
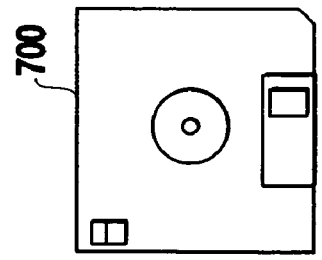
FIG. 7 illustrates a signal-bearing media 700 which may store computer-readable instructions for performing a page-ranking method, according to the exemplary aspects of the present invention.

Alternatively, the search term (e.g., key word search term) may be categorized into one of the relevant categories in the value ranking (e.g., see FIG. 4D). In this case, the pages could be returned based on the value ranks of the page in those specific categories. For example, if the search term is categorized into category 1, in response to the search, the pages may be returned from the highest value ranking in category 1 to the lowest value ranking in category 1.

Further, computation of the expertise rank and value rank may be iterative processes, since the bases for these computations generally change over time. A page may be assigned a content relevance rank when it is added to the network collection (e.g., the intranet collection). The content relevance rank may also be re-assigned when it the page is modified.

A learning capability can be added to the computation of expertise rank. For example, if a personal desktop contains references to pages (e.g., intranet pages) throughout a period of time in which the value ranks of those pages rise, that person can be the to be a good forecaster of valuable pages. Therefore, his expertise in the categories with which those pages are associated can be adjusted upward. Similarly, if the ranks of referenced pages decrease over time, then persons holding references to those pages throughout the period should have their expertise ranks adjusted downward.

The page-ranking method (and system) may also be incorporated in a method and system for searching a network such as an intranet. That is, the present invention includes a search method (and system) which ranks pages on a network by mining at least a portion of a user workstation (e.g., a plurality of user workstations) which is connectable to (e.g., connected to or may be connected to) a network to obtain page references.

FIG. 5 illustrates a network 500 (e.g., an intranet) which may utilize the page-ranking method (and system) according to the exemplary aspects of the present invention. It should be noted that the network 500 is only meant to be illustrative. That is, the present invention may be utilized by a network including more or less components than those illustrated in FIG. 6.

The network 500 (e.g., a simple intranet solution) may be used, for example, as a corporate intranet. As illustrated in FIG. 5, the network 500 may include an ethernet 502 for connecting to the Internet 504. The network 500 may also include ethernet 506 which is separated from ethernet 502 by a firewall 508 (e.g., a plurality of firewalls).

The ethernet 506 may be connected to ethernet 510 via controller 512 (e.g., traffic management device). The controller 512 may provide, for example, load balancing (e.g., high-availability load balancing), layer switching, granular interactive control, disk operating system (DoS) protection, resource pooling and a number of other features to help protect an enterprise's Internet presence. The controller 512 may be aware of everything contained in the traffic going to and coming from the applications—allowing it to guarantee availability and accelerate application performance.

The network 500 may also include a web server 514 (e.g., a plurality of web servers), a cache server 516 (e.g., a plurality of cache servers), and a user workstation 518 (e.g., a plurality of workstations) which may be used by a user, for example, for searching for data on the network 500 (e.g., data stored in web servers 514 or cache servers 516). The user workstations 518 may include a standard graphical user interface (GUI) and may include for example, a microprocessor, memory device, display device, input device, printing device, etc.

In the network 500, a virtual server may perform load balancing for several different types of connection requests, including, for example, 1) HTTP connections to the company's network (e.g., intranet) web site. The controller 512 load balances the web servers 514 that may host a company's web site (e.g., the corporate intranet web site);

2) HTTP connections to Internet content. These connections may be handled through cache servers 516 that are also load balanced by the controller 512; and 3) Non-HTTP connections to the Internet 504.

As illustrated in FIG. 5, the non-network (e.g., non-intranet) connections may be handled by virtual servers 515, 517 (e.g., wildcard virtual servers). The server 515 may handle traffic to the company website. The server 517 may handle traffic to the cache servers 516 and is port specific, specifying a port for HTTP requests. In this manner, all HTTP requests not matching an IP address on the network (e.g., intranet) may be directed to the cache server 516.

The server 519 (e.g., wildcard virtual server) handling non-HTTP requests may be a default virtual server (e.g., default wildcard server). A default wildcard virtual server is one that uses only port 0 (or any or * or " "[blank string]). This makes it a catch-all match for outgoing traffic that does not match any standard virtual server or any port-specific wildcard virtual server.

For example, on the network 500 which may include a plurality of user workstations 518, a user can open the searching software (e.g., stored on server 516) such that the display of the user workstation displays a search screen having a region for inputting a keyword search. The user may input one or more keywords to initiate the search by mining at least a portion (e.g., segmnent) of the user workstations 518 on the network (e.g., intranet).

The search may identify the pages (e.g., intranet pages) which include the keyword(s) and then refer to the value ranking chart (e.g., see FIG. 5D) to determine the order in which the pages are displayed on the display device of the user workstation 518 in response to the search.

It should be noted that the page-ranking method (and system) of the present invention may be used instead of a conventional page-ranking method. The page-ranking method (and system) of the present invention may also be used in addition to a conventional method. That is, the page-ranking method (and system) of the present invention may be used to supplement a conventional method, or may be supplemented by a conventional page-ranking method.

Figure 6:
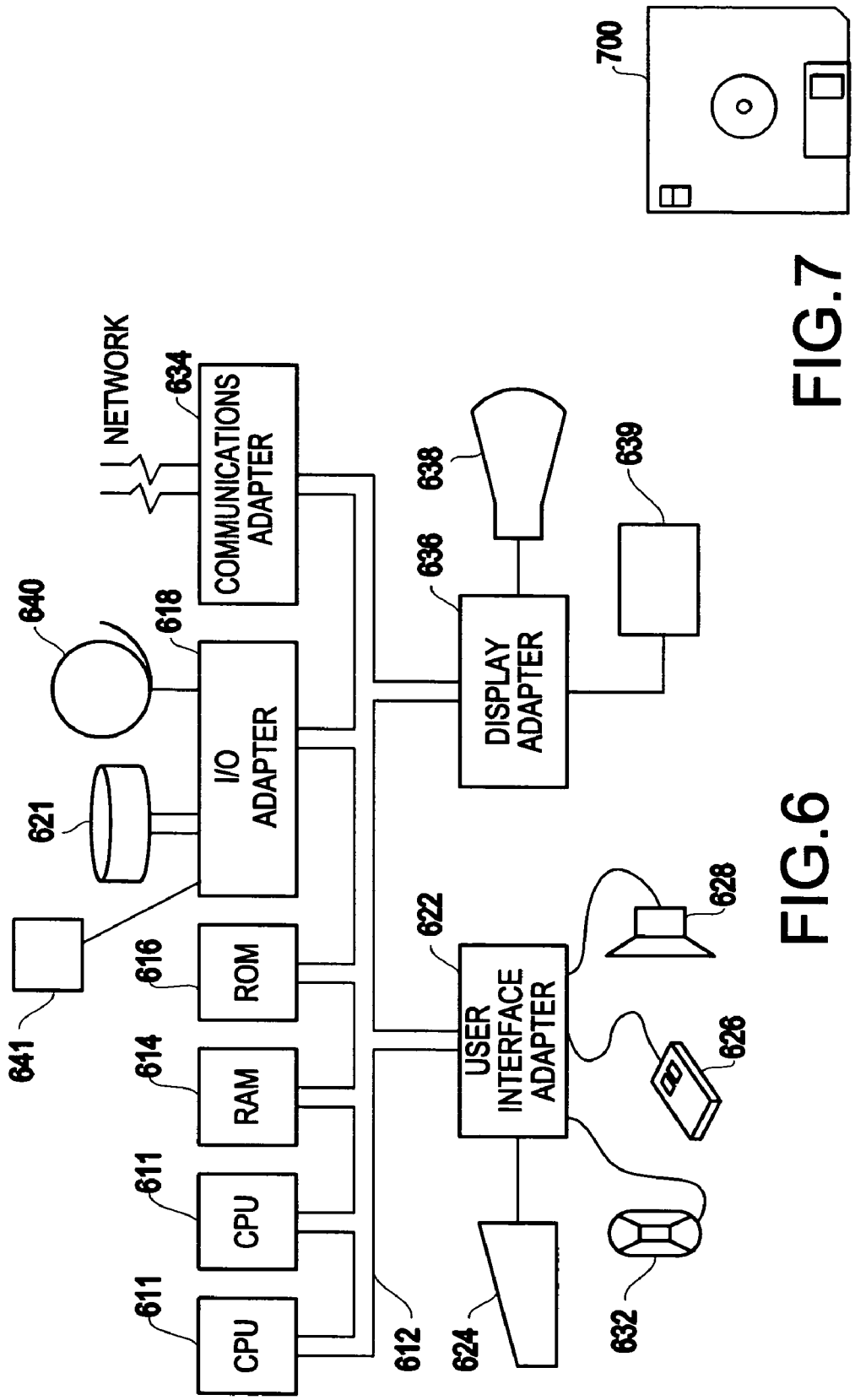
FIG. 6 illustrates a system 600 which includes a typical hardware configuration which may be used for implementing the page-ranking method and system, according to the exemplary aspects of the present invention.

FIG. 6 illustrates a system 600 which includes a typical hardware configuration which may be used for implementing the page-ranking method and system, according to the exemplary aspects of the present invention. The configuration has preferably at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, and network (e.g., intranet), a personal area network (PAN), etc., and a display adapter 636 for connecting the bus 612 to a display device 638 and/or printer 639. Further, an automated reader/scanner 641 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 611 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 611 and hardware above, to perform the method of the invention.

This signal-bearing media may include, for example, a RAM contained within the CPU 611, as represented by the fast-access storage for example. Alternatively, the instructions may be contained in another signal-bearing media, such as a magnetic data storage diskette 700 (FIG. 7), directly or indirectly accessible by the CPU 611.

Whether contained in the computer server/CPU 611, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C," etc.

With its unique and novel features, the present invention provides a page-ranking method (and system) which may be used to quickly and efficiently return a large number of highly relevant pages in response to a network search.

While the invention has been described in terms of one or more exemplary embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

The invention claimed is:

1. A page-ranking method, comprising:
designating a portion of content stored on a hard drive of plural user workstations which are connectable to a network, such that said portion is not accessible for mining to detect references to plural pages on said network;
developing a set of information categories which are relevant to said network;
assigning a content relevance rank to said plural pages for said set of categories, said content relevance rank indicating a degree of relevance of a page of said relevance rank indicating a degree of relevance of a page of said plural pages in a category of said plural categories;
assigning an expertise rank to plural persons associated with said plural user work stations in said categories, said expertise ranking indicating a level of expertise for a person of said plural persons with respect to a category of said plural categories; and
computing a value rank for said plural pages in said plural categories, said value rank indicating a level of value for a page of said plural pages with respect to a category of said plural categories, said computing said value rank comprising:
mining a portion of said content stored on said hard drive of said plural user workstations which is other than said designated portion to detect references to said plural pages, and counting a number of said references to said plural pages; and
if a reference to a page is detected in a mined portion of said content of a user workstation, then increasing said value rank of said referenced page in said plural categories based on the content relevance rank of the referenced page and the expertise rank of a person of said plural persons who is associated with said user workstation,
if a reference to a page is detected in an e-mail in the mined portion of the content of the user workstation, then increasing the value rank of the referenced page based on the content relevance rank of the referenced page, the expertise rank of the sender of the e-mail and the expertise rank of the recipient of the e-mail
wherein if a reference to a page is detected in an e-mail, then said value rank of said page is adjusted based on the expertise rank of the sender and a recipient of said page, and the relevance rank of the page, and if a reference to a page is detected in a message passed through an instance messaging facility, then said value rank of said page is adjusted based on an expertise rank of a sender of said message, an expertise rank of a recipient of said message, and the relevance rank of the page
wherein said mined portion of content comprises a file that is textually minable and is one of residing on and attached to a user workstation,
wherein said network comprises an intranet, and mining said portion of said content is performed as part of a back-up process for said intranet,
wherein said mining comprises using at least one of scanning code and crawling code to detect said references,
wherein said assigning said expertise rank comprises assigning a weight to a user workstation based on references detected in said mined portion of content, and based on a time at which high quality pages are stored on said user workstation,
wherein said mined portion of content comprises browser bookmarks, e-mails, instant messages and unstructured text files, and
wherein said mining said portion of said content, and ranking said pages are performed routinely and periodically.

2. The method of claim 1, wherein said mining said portion of content comprises using a software implemented mining device which is stored as software on a central server of said network.

3. The method of claim 1, wherein said mining said portion of content is scheduled independently by said user of said user workstation.

4. The method of claim 1, wherein said mining said portion of content is scheduled to be performed at a time when the user workstation is likely to be idle.

5. The method of claim 1, wherein said reference to said page comprises a hyperlink to said page.

6. An intranet search method, comprising:
entering a search query;
ranking plural pages of said network, comprising
designating a portion of content stored on a hard drive of plural user workstations which are connectable to a network, such that said designated portion is not accessible for mining to detect references to plural pages on said network;
developing a set of information categories which are relevant to said network;
assigning a content relevance rank to said plural pages for said set of categories, said content relevance rank indicating a degree of relevance of a page of said relevance rank indicating a degree of relevance of a page of said plural pages in a category of said plural categories;
assigning an expertise rank to plural persons associated with said plural user work stations in said categories, said expertise ranking indicating a level of expertise for a person of said plural persons with respect to a category of said plural categories; and
computing a value rank for said plural pages in said plural categories, said value rank indicating a level of value for a page of said plural pages with respect to a category of said plural categories, said computing said value rank comprising:
mining a portion of said content stored on said hard drive of said plural user workstations which is other than said designated portion to detect references to said plural pages, and counting a number of said references to said plural pages; and
if a reference to a page is detected in a mined portion of said content of a user workstation, then increasing said value rank of said referenced page in said plural categories based on the content relevance rank of the referenced page and the expertise rank of a person of said plural persons who is associated with said user workstation,
if a reference to a page is detected in an e-mail in the mined portion of the content of the user workstation, then increasing the value rank of the referenced page based on the content relevance rank of the referenced page, the expertise rank of the sender of the e-mail and the expertise rank of the recipient of the e-mail
wherein if a reference to a page is detected in an e-mail, then said value rank of said page is adjusted based on the expertise rank of the sender and a recipient of said page, and the relevance rank of the page, and if a reference to a page is detected in a message passed through an instance messaging facility, then said value rank of said page is adjusted based on an expertise rank of a sender of said message, an expertise rank of a recipient of said message, and the relevance rank of the page wherein said mined portion of content comprises a file that is textually minable and is one of residing on and attached to a user workstation, wherein said network comprises an intranet, and mining said portion of said content is performed as part of a back-up process for said intranet, wherein said mining comprises using at least one of scanning code and crawling code to detect said references, wherein said assigning said expertise rank comprises assigning a weight to a user workstation based on references detected in said mined portion of content, and based on a time at which high quality pages are stored on said user workstation, wherein said mined portion of content comprises browser bookmarks, e-mails, instant messages and unstructured text files, and wherein said mining said portion of said content, and ranking said pages are performed routinely and periodically.

7. The method of claim 6, wherein said returning said list of pages comprises returning said list of pages in an order which is a function of the pages' value ranks.

8. The method of claim 6, wherein said returning said list of pages comprises returning said list of pages in an order which is based on the sum of the pages' value ranks across all of the categories.

9. The method of claim 6, wherein said returning said list of pages comprises returning said list of pages in an order which is based on the pages' highest value rank in any category.

10. The method of claim 6, wherein said returning said list of pages comprises returning said list of pages in an order which is based on the pages' highest median value rank across the categories.

11. The method of claim 6, wherein a keyword search term used in said search may be categorized into one of the relevant categories in the value ranking, and said returning said list of pages comprises returning said list of pages in an order which is based on the value ranks of the page in the category into which the search term is categorized.

12. An page-ranking method, comprising:

designating a portion of content stored on a hard drive of plural user workstations which are connectable to a network, such that said designated portion is not accessible for mining to detect references to plural pages on said network;

developing a set of information categories which are relevant to said network;

assigning a content relevance rank to said plural pages for said set of categories, said content relevance rank indicating a degree of relevance of a page of said relevance rank indicating a degree of relevance of a page of said plural pages in a category of said plural categories;

assigning an expertise rank to plural persons associated with said plural user work stations in said categories, said expertise ranking indicating a level of expertise for a person of said plural persons with respect to a category of said plural categories; and computing a value rank for said plural pages in said plural categories, said value rank indicating a level of value for a page of said plural pages with respect to a category of said plural categories; and computing a value rank for said plural pages in said plural categories, said value rank indicating a level of value for a page of said plural pages with respect to a category of said plural categories, said computing said value rank comprising:

mining a portion of said content stored on said hard drive of said plural user workstations which is other than said designated portion to detect references to said plural pages, and counting a number of said references to said plural pages; and if a reference to a page is detected in a mined portion of said content of a user workstation, then increasing said value rank of said referenced page in said plural categories based on the content relevance rank of the referenced page and the expertise rank of a person of said plural persons who is associated with said user workstation, if a reference to a page is detected in an e-mail in the mined portion of the content of the user workstation, then increasing the value rank of the referenced page based on the content relevance rank of the referenced page, the expertise rank of the sender of the e-mail and the expertise rank of the recipient of the e-mail.

13. The method of claim 12, wherein if a reference to a page is detected in an e-mail, then said value rank of said page is adjusted based on the expertise rank of a sender and a recipient of said page, and the relevance rank of the page, and if a reference to a page is detected in a message passed through an instant messaging facility, then said value rank of said page is adjusted based on an expertise rank of a sender of said message, an expertise rank of a recipient of said message, and the relevance rank of the page.

14. The method of claim 13, wherein said mined portion of content comprises a file that is textually minable and is one of residing on and attached to a user workstation.

15. The method of claim 14, said network comprises an intranet, and mining said portion of said content is performed as part of a back-up process for said intranet, and wherein said mining comprises using at least one of scanning code and crawling code to detect said references.

16. The method of claim 15, wherein said assigning said expertise rank comprises assigning a weight to a user workstation based on references detected in said mined portion of content, and based on a time at which high quality pages are stored on said user workstation.

17. The method of claim 16, wherein said mined portion of content comprises browser bookmarks, e-mails, instant messages and unstructured text files.

18. The method of claim 17, wherein said mining said portion of said content, and ranking said pages are performed routinely and periodically.

19. The method of claim 1, wherein said assigning said expertise rank comprises:

assigning an initial expertise rank for said person in a category of said categories; and increasing said initial expertise rank based on a number of references detected in a workstation of said person in said category.

20. The method of claim 1, wherein said page on said network comprises an intranet document.

* * * * *